US006688308B1

(12) United States Patent
Phillips et al.

(10) Patent No.: US 6,688,308 B1
(45) Date of Patent: Feb. 10, 2004

(54) METHOD OF TESTING AN AIRCRAFT OXYGEN SUPPLY SYSTEM

(75) Inventors: Robert John Phillips, Devon (GB); Christopher Michael Noonan, Somerton (GB)

(73) Assignee: Normalair-Garrett (Holdings) Limited, Yeovil Somerset (GB)

( * ) Notice: Subject to any disclaimer, the term of this patent is extended or adjusted under 35 U.S.C. 154(b) by 0 days.

(21) Appl. No.: 09/269,328

(22) PCT Filed: Jul. 16, 1998

(86) PCT No.: PCT/GB98/02116

§ 371 (c)(1),
(2), (4) Date: Aug. 20, 1999

(87) PCT Pub. No.: WO99/04858

PCT Pub. Date: Feb. 4, 1999

(30) Foreign Application Priority Data

Jul. 26, 1997 (GB) ............................................. 9715747

(51) Int. Cl.$^7$ ........................ A61M 16/00; A62B 7/00; F16K 31/02
(52) U.S. Cl. ........................ 128/204.22; 128/204.29; 128/205.11
(58) Field of Search ........................ 129/204.22, 204.29, 129/205.11, 205.13–205.15

(56) References Cited

U.S. PATENT DOCUMENTS

| 3,593,735 | A | * | 7/1971 | Reiher ............................. 137/88 |
| 3,672,388 | A | * | 6/1972 | Ringwall et al. ............... 137/88 |
| 4,109,509 | A | * | 8/1978 | Cramer et al. ................... 73/23 |
| 4,194,891 | A | * | 3/1980 | Earls et al. ....................... 55/26 |
| 4,198,213 | A | * | 4/1980 | Mannatt ........................... 55/16 |
| 4,236,546 | A | * | 12/1980 | Manley et al. ................. 137/88 |
| 4,282,870 | A | * | 8/1981 | Porlier .................... 128/203.14 |
| 4,336,590 | A | * | 6/1982 | Jacq et al. ................... 364/418 |
| 4,359,328 | A | * | 11/1982 | Wilson ........................... 55/26 |
| 4,519,387 | A | * | 5/1985 | Durkan et al. .......... 128/204.23 |
| 4,587,967 | A | * | 5/1986 | Chu et al. ............... 128/204.21 |
| 4,627,860 | A | * | 12/1986 | Rowland ....................... 55/162 |
| 4,651,728 | A | * | 3/1987 | Gupta et al. ........... 128/201.28 |
| 4,823,788 | A | * | 4/1989 | Smith et al. ........... 128/205.24 |
| 4,963,327 | A | * | 10/1990 | Russel ......................... 422/120 |
| 5,022,393 | A | * | 6/1991 | McGray et al. ........ 128/205.23 |
| 5,071,453 | A | * | 12/1991 | Hradek et al. ................. 55/21 |
| 5,199,423 | A | * | 4/1993 | Harral et al. ........... 128/202.26 |
| 5,531,807 | A | * | 7/1996 | McCombs ....................... 95/26 |
| 5,809,999 | A | * | 9/1998 | Lang ..................... 128/200.24 |
| 6,279,377 | B1 | * | 8/2001 | Cao .......................... 73/23.31 |

FOREIGN PATENT DOCUMENTS

| EP | 0 364 283 A | 4/1990 |
| EP | 0 423 496 A | 4/1991 |
| EP | 0 767 139 A | 4/1997 |

OTHER PUBLICATIONS

Merriam Websdter's Collegiate Dictionary, 10th Edition 1997, p. 26 definition of "Alarm".*

* cited by examiner

Primary Examiner—Weilun Lo
Assistant Examiner—Joseph F. Weiss, Jr.
(74) Attorney, Agent, or Firm—Marshall, Gerstein & Borun LLP

(57) ABSTRACT

A system and method of performance testing an aircraft's oxygen supply system where demand is assured by in use performance testing and monitoring by a controller and monitor for the partial pressure of oxygen necessary to meet demand in a pressurized aircraft. The system and method utilizing a predetermined performance test signal sent out at pre-programmed intervals of time during use, receiving, evaluation and responding to performance test signal control data received in response to the performance test signal and adjusting the partial pressure of oxygen to meet demand if necessary.

11 Claims, 1 Drawing Sheet

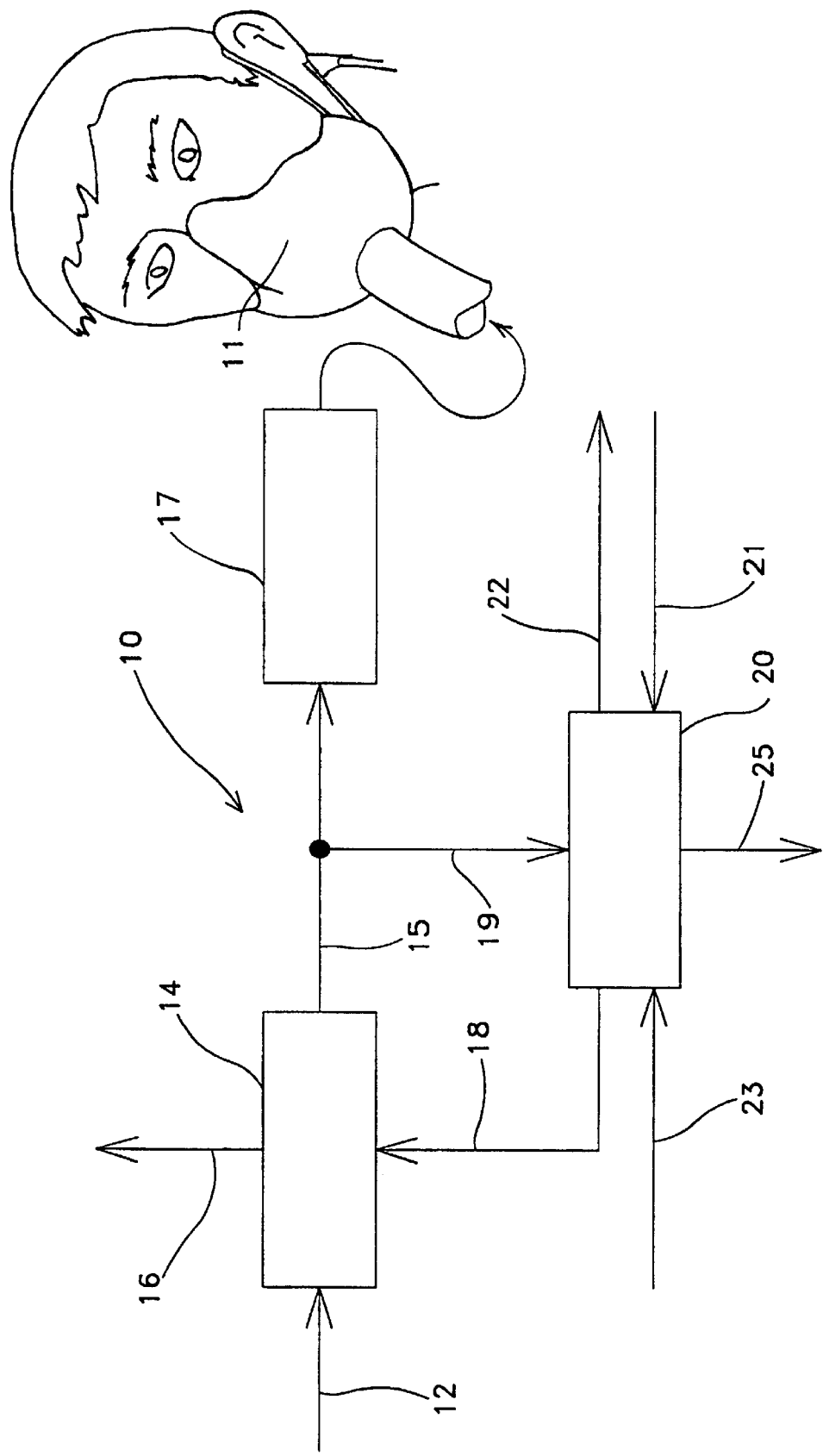

METHOD OF TESTING AN AIRCRAFT OXYGEN SUPPLY SYSTEM

DESCRIPTION OF INVENTION

This invention relates to a method of testing the performance of a oxygen supply system in an aircraft, and additionally optionally re-calibrating the system if required.

Known oxygen supply systems comprises an oxygen concentrating device which separates air into oxygen enriched product gas and oxygen depleted gas and provides the, product gas to a breathing regulator which regulates the pressure at which that gas may be breathed.

A sample of the product gas fed to a monitoring means which monitors the oxygen concentration or partial pressure within the product gas. A control means responds to the monitoring means to provide control signals to the oxygen concentrating device so that the concentration or partial pressure of oxygen in the product gas can be controlled. The control means may also receive control data signals indicative of for example, the altitude of an aircraft, so that the concentration or partial pressure of oxygen in the product gas can appropriately be adjusted for breathing at that particular altitude.

Of course, when such an oxygen supply system is manufactured, the system is calibrated so that appropriate control signals are provided from the control means to the oxygen concentrating device, to result in the maintenance of, or a desired increase or decrease of, oxygen concentration or partial pressure in the product gas. However, in use, the performance of the oxygen concentrating device and/or the oxygen monitoring means may change. For example, the ability of the oxygen concentrating device to produce product gas with high oxygen concentrations or partial pressure may degrade with use, brought about, perhaps due to contamination of the oxygen concentrating device. Hence a particular control signal from the control means to the oxygen concentrating device may not bring about an expected oxygen concentration or partial pressure in the product gas.

In U.S. Pat. No. 4,516,424 there is described an apparatus for monitoring the performance of an oxygen monitoring means. Gas from an external source, with a known oxygen concentration or partial pressure such as ambient air is provided to a monitoring means, to test that the oxygen concentration material is that of the known concentration. In U.S. 4,516,424, the system is a breathing system for medical use and there is a complex series of valves whereby ambient air can be fed to the monitoring means for testing purposes.

Another approach is to provide external monitoring of the oxygen concentration or partial pressure in the product gas which may involve duplication of components.

These prior proposals have disadvantages in that where it is required to provide an external source of gas or external testing apparatus, if testing is regularly to be carried out it is necessary to provide an external source of oxygen, additional valves and the like, and/or external testing equipment which, particularly where the system is applicable to an aircraft, undesirably adds weight.

According to a first aspect of the invention we provide a method of testing the performance of an oxygen supply system in an aircraft comprising an oxygen supply device adapted to supply oxygen in varying concentrations within a product gas in accordance with demand, in response to control signals, a monitoring means to monitor the concentration or partial pressure of oxygen in the product gas, and a control means responsive to the monitoring means to provide the control signals to the oxygen supply device, the method being characterised in that the control means provides a predetermined control signal to the oxygen supply device which is expected to respond to supply a known concentration or partial pressure of oxygen in the product gas, and monitoring the concentration of oxygen supplied.

Thus by utilising the method of the invention, performance of the oxygen supply system in response to the control signal can be tested without requiring any substantial extra apparatus or components and thus weight. Simply, the control means can be modified to provide the predetermined control signal to the oxygen supply device when testing of the system is required.

Although the invention is applicable to an oxygen supply system in which the oxygen supply device actually generates oxygen, e.g. a ceramic type oxygen generator, the oxygen supply device preferably comprises an oxygen concentrator adapted, in response to control signals, to separate from a gas stream e.g. ambient air, oxygen and thus to increase the concentration or partial pressure of the oxygen in the product gas stream.

The control means may be adapted in normal use of the system, to provide a control signal to the oxygen supply device in response to the monitoring means and in response to control data, the control signal being determined by the control means to cause the oxygen supply device to supply oxygen at a concentration or partial pressure in the product gas appropriate to a demand for the oxygen indicated by the control data.

Thus for example only, the control data may contain information concerning the altitude of the aircraft as well as the demand for the oxygen determined by a breathing regulator which supplies breathing gas to an air crew member. However the control data may contain other information pertinent to the demand for the oxygen.

The predetermined control signal provided to the oxygen supply device during testing may be such that the oxygen supply device is expected to supply a maximum or minimum concentration or partial pressure of oxygen in the product gas which the oxygen supply device is capable of supplying.

Thus, the oxygen concentrating device may be arranged simply to allow ambient air to pass through the device without separating out oxygen so that the concentration of oxygen in the product gas would be that naturally occurring in the air, i.e. about 21%. Alternatively, the predetermined control signal be that which is expected to result in the oxygen concentrating device providing product gas containing the maximum possible concentration or partial pressure of oxygen, which in a zeolite based pressure swing system would typically be about 95% oxygen.

The method may include first providing a control signal so as to achieve a minimum concentration of oxygen in the product gas, and then providing a control signal to the oxygen supply device which is expected to achieve a maximum concentration of oxygen in the product gas.

Of course the invention is also applicable to other oxygen concentrating devices such as, for examples other pressure swing systems, or thermal swing systems, or electrolytic systems.

In the event that the concentration or partial pressure of oxygen in the product gas in response to the predetermined control signal is found not to be as expected, the control means may be arranged either simply to provide an error signal to an indicating means such as an alarm or monitoring gauge, or alternatively the control means may be arranged to recalibrate the system such that in subsequent normal use the oxygen supply device supplies in the product gas stream a desired concentration or partial pressure of oxygen in response to control data indicating oxygen demand.

The method of testing in accordance with the invention may be carried out at any desired time on the oxygen supply system but particularly, may be carried out at intervals during normal operation of the system and/or upon start-up of the system and/or upon shut down and/or by manual initiation.

Preferably the method is carried out before the aircraft takes off, or at least before the oxygen supply system is required to operate.

According to a second aspect of the invention we provide an oxygen supply system for an aircraft comprising an oxygen supply device adapted to supply oxygen in varying concentrations within a product gas stream in response to control signals, a monitoring means to monitor the concentration or partial pressure of oxygen in the product gas, and a control means responsive to the monitoring means to provide the control signals to the oxygen supply device, the system being characterised in that the control means is adapted to provide a predetermined control signal to the oxygen supply device which is expected to respond to supply a known concentration or partial pressure of oxygen in the product gas.

According to a third aspect of the invention we prove an aircraft having an oxygen supply system which may be operated by a method according to the first aspect of the invention.

The invention will now be described with reference to the accompanying drawing which is an illustrative diagram of an oxygen supply system for an aircraft the performance of which may be tested by a method in accordance with the invention.

Referring to the drawing there is shown an oxygen supply system 10 which in the present example, is an oxygen supply system for use in supplying product gas containing oxygen to a mask 11 of an air crew member in an aircraft.

The oxygen is derived from an ambient air supply 12 which is fed to an oxygen concentrating device 14 which separates the ambient air supply 12 into oxygen enriched product gas 15, and oxygen depleted air 16, in response to control signals fed to the oxygen concentrating device 14 from a control line 18. The product gas containing oxygen is then fed to a breathing regulator 17 which controls the supply of the product gas, to die mask 11, depending upon altitude, and air crew breathing demand.

A proportion of the product gas 15 containing the oxygen, is fed via a sampling line 19 to a monitoring means and controlling means which in the present example is a combined unit indicated at 20. The monitoring means of the unit 20 determines the oxygen concentration or partial pressure within the sampled gas and the control means also responds to control data fed thereto along a command line 21, to provide an appropriate control signal along line 18 to the oxygen concentrating device 14. Thus as conditions change, for example as the altitude of the aircraft increases or decreases, or the aircrew member breathing demand changes, the control means of unit 20 provides an alternative control signal to the oxygen concentrating device 14 which responds by varying the oxygen concentration in the product gas 15.

In the drawings, there is shown an output data line 22 which may provide output data for example, for a built-in test facility, or to a gauge or other indicating means indicating the concentration or partial pressure of oxygen in die product gas. A power line is indicated at 23 providing power to the monitoring/control means unit 20.

Thus far, the system 10 is substantially conventional. However in accordance with tie invention, the performance of the system 10 can be tested by tie control means of unit 20 providing a predetermined control signal along line 18 to the oxygen concentrating device 14 which is expected to result in the device 14 supplying a known concentration or partial pressure of oxygen in the product gas stream 15.

For example, the control signal along line 18 may control the oxygen concentrating device 14 to permit the ambient air supply 12 to pass through the oxygen concentrating device 14 without separating the ambient air into oxygen rich and oxygen depleted gas components. Thus the product gas 15 will contain a known concentration or partial pressure of oxygen being the concentration of oxygen in the ambient air i.e. typically about 21%. A sample of that product gas is then provided to the monitoring means of unit 20 which thus monitors the concentration or partial pressure of oxygen in the product gas. In the event that the oxygen concentration or partial pressure monitored is found not to be as expected, this would indicate that tie system 10 is not performing according to its calibration. Of course, some purging of the system 10 may be required before the sample is tested.

Particularly, in the event that the product gas 15 is ambient air and the monitoring means of unit 20 determines that the oxygen concentration or partial pressure in the product gas is greater or less than expected, this would indicate a fault with the monitoring means of unit 20. This may for example be due to drift in the performance of the oxygen concentrating device or some other cause.

In the alternative, or subsequently or even previously, the system 10 may be tested by the control means of unit 20 arranging to send a predetermined control signal along line 18 to the oxygen concentrating device 14 which is expected to cause the oxygen concentrating device 14 to operate to its optimum. The maximum possible concentration of oxygen or partial pressure of oxygen in the product gas would then be expected to be supplied and typically, a zeolite based pressure swing oxygen concentrating device 14 might be expected to produce product gas containing up to 95% concentration of oxygen. In the event that the monitoring means 20 determines a lesser concentration or partial pressure of oxygen in the product gas 15 in response to that predetermined control signal, this may be attributable either to under performance of the oxygen concentrating device 14, and/or malfunction of the monitoring means of unit 20, and thus filer investigation would be required to determine the reason for the discrepancy.

In the event that the concentration or partial pressure of oxygen in the product gas is determined by the monitoring means 20 to be greater than 95%, this could only indicate an error in the operation of the monitoring means of unit 20, as the oxygen concentration determined would be greater than the theoretical maximum obtainable by the oxygen concentrating device 14.

In one embodiment, upon the system 10 failing a test, a signal may simply be sent along the line 2 to an indicating means which may have an alarm means if desired. Alternatively, where the monitoring means 20 is expected not to be at fault, or this is established by testing, e.g. by providing ambient air product gas to the monitoring means 20 previously as described above, the control means 20 may be arranged to re-calibrate the system 10 so as to provide control signals along line 18 to achieve the desired concentration or partial pressure of oxygen in the product gas in line 15.

The ambient air supply 12 fed to the oxygen concentrating device 14 may be derived from for example, a gas turbine bleed in an aircraft or otherwise from ambient atmosphere. The breathing regulator 17 may comprise a regulating valve which supplies breathing gas to an aircrew member at a pressure appropriate for the altitude and at a flow rate equal to the demand. The mask 11 may be an oral-nasal type mask worn by the au crew.

The sampled gas which is monitored by the monitoring means of unit 20 may be exhausted from the monitoring/control means of unit 20 via an exhaust line 25 to atmosphere.

The monitoring means of unit 20 may comprise a pumped cavity ceramic membrane device, although any other suitable means for monitoring the concentration or partial pressure of oxygen or another specific gas in the product gas stream 15 may alternatively be used.

The control signals sent by the control means 20 to the oxygen concentrating device 14, may comprise a sequence of commands or any other control signal appropriate to the oxygen concentrating device 14.

It will be appreciated that during testing, the concentration or partial pressure of oxygen in the product gas 15 monitored by the monitoring means of unit 20 may be that which is expected in response to the predetermined control signal fed to the oxygen concentrating or other oxygen supply device 14, where there are equal and opposite errors occurring in the oxygen concentrating or other oxygen supply device 14 and the monitoring means. However it is considered that the likelihood of this occurring is statistically insignificant.

The method of the invention enables the system, particularly the performance of the monitoring means, e.g. an oxygen sensor of the monitoring means 20, to be monitored and the performance of the oxygen generating device 14, to be tested, as frequently as desired. The method may be performed during start up and/or close down of the oxygen generating system and/or may be performed at intervals during system operations in flight.

Various modifications may be made without departing from the scope of the invention.

For example, whereas the invention has been described in relation to a system in which the oxygen supply device 14 is a concentrator of oxygen, the invention may be applied to a system in which the oxygen supply device 14 actually generates the oxygen, such as an electrolyte or ceramic type oxygen generator.

The monitoring/control means 20 may be separate or combined as a unit 20 as described. Where separate, the monitoring means would need to provide an appropriate signal to the control means indicative of the monitored concentration or partial pressure of the oxygen in the product gas.

If desired, particularly but not exclusively where the testing method described is performed at intervals, die sensitivity of the system to errors between the expected and actual concentrations or partial pressures of oxygen in response to the control signal, may be varied with conditions.

For example if the test was performed on a recently started-up system, one might expect some such error. The control means may thus be arranged to ignore minor errors under such conditions, but may be arranged to indicate such an error, and re-calibrate the system where this is possible, under other operating conditions.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. An aircraft oxygen supply system equipped for performance testing of the system, comprising:

an oxygen supply device adapted to supply oxygen in varying concentrations within a product gas in response to control signals generated according to demand;

a monitoring means to monitor the concentration of oxygen in the product gas; and a control means responsive to the monitoring means to provide the control signals to the oxygen supply device said control means programmed to provide, at predetermined intervals, a predetermined performance test control signal to the oxygen supply device which is expected to respond by supplying control data including a corresponding known test concentration or a known partial pressure of oxygen in the product gas, and the control means being adapted in normal use to provide a control signal to the oxygen supply device in response to the monitoring means and control data, the control signal being determined by the control means to cause the oxygen supply device to supply oxygen at a concentration or partial pressure in the product gas appropriate to a demand for the specific fluid indicated by the control data;

said monitoring means programmed to monitor the known test concentration or the known partial pressure of oxygen supplied by the oxygen supply device in response to the predetermined performance test control signal, and further programed to determine if the known test concentration or the known partial pressure of oxygen supplied by the oxygen supply device is as expected in view of the predetermined performance test control signal, and if the known test concentration or partial pressure of oxygen supplied by the oxygen supply device is not as expected in view of the predetermined performance test control signal, said monitoring means programmed to provide an alarm indication.

2. The system of claim 1, wherein said alarm indication is provided by the monitoring means, upon a failure of a test including comparing one of the known test concentration or the known partial pressure of oxygen supplied by the oxygen supply device to an expected value based on the predetermined performance test control signal, sending a signal along an output data line in communication with the monitoring means to an indication means having an alarm means.

3. The system of claim 1, wherein said control means is adapted such that the control signal causes the oxygen supply device to supply oxygen at a concentration in the product gas in a range from 21% to 95%.

4. A system according to claim 1 wherein the oxygen supply device comprises an oxygen concentrator adapted, in response to the control signals, to separate oxygen from a gas stream, thus to increase the concentration or partial pressure of the oxygen in the product gas stream.

5. A system according to claim 1 wherein the oxygen supply device is a zeolite based pressure swing gas adsorption device.

6. An aircraft oxygen supply system equipped for performance testing of the system, comprising;

an oxygen supply device arranged to supply oxygen in a product gas according to demand;

an oxygen monitor arranged to monitor the concentration of oxygen in the product gas;

a control means responsive to the oxygen monitor and arranged to provide control signals to the oxygen supply device, the control means programmed to output a predetermined performance test control signal to the oxygen supply device;

the oxygen supply device arranged to respond to the predetermined performance test control signal by supplying a test output to the product gas, the test output including at least one of a known oxygen concentration in the product gas or a known partial pressure of oxygen in the product gas;

the oxygen monitor further programmed to monitor the test output and to determine whether the test output is in an expected output range in view of the predetermined performance test control signal; and the oxygen monitor further programmed to provide an alarm indication signal along an output data line to an indication means having an alarm in the event the test output is outside the expected output range.

7. A method of testing the performance of an oxygen supply system in an aircraft including an oxygen supply device adapted to supply oxygen in varying concentrations within a product gas according to demand, in response to control signals generated according to demand, a monitoring means to monitor the concentration of oxygen in the product gas, and a control means responsive to the monitoring means to provide the control signals to the oxygen supply device, the method of testing comprising the steps of:

providing a predetermined performance test control signal by the control means to the oxygen supply device which is expected to respond by supplying a corresponding known test concentration or partial pressure of oxygen in the product gas;

monitoring by the monitoring means the test concentration or partial pressure of oxygen supplied by the oxygen supply device in response to the predetermined performance test control signal, and determining if the test concentration or partial pressure of oxygen supplied by the oxygen supply device is as expected in view of the predetermined performance test control signal; and if the test concentration or partial pressure of oxygen supplied by the oxygen supply device is not as expected in view of the predetermined performance test control signal, providing an alarm indication by the monitoring means sending a signal along an output data line in communication with the monitoring means, to an indication means having an alarm means.

8. A method according to claim 7, wherein the predetermined performance test control signal is provided by the control means upon one of the start up of the system, shut down of the system, and by manual initiation.

9. A method according to claim 7 wherein the predetermined performance test control signal provided to the oxygen supply device during testing is such that the oxygen supply device supplies a corresponding maximum or a minimum test concentration or partial pressure of oxygen in the product fluid stream which the oxygen supply device is capable of supplying.

10. A method according to claim 7 wherein in the event that the test concentration or partial pressure of oxygen supplied in the product gas in response to the predetermined performance test control signal, is determined not to be as expected, recalibrating the oxygen supply system by the control means providing recalibration control signals to the oxygen supply device such that in subsequent normal use, the oxygen supply device supplies in the product gas, a desired concentration or partial pressure of oxygen in response to control data indicating oxygen demand.

11. A method according to claim 7 wherein the predetermined performance test control signal is provided by the control means at intervals during normal operation of the system.

* * * * *